US006058601A

United States Patent [19]

DeKoning

[11] Patent Number: 6,058,601

[45] Date of Patent: May 9, 2000

[54] APPARATUS FOR AUTOMATIC FENCE PANEL ASSEMBLY

[76] Inventor: Hubertus C. M. DeKoning, P.O. Box 15, Eden, Manitoba, Canada, R0J 0M0

[21] Appl. No.: 09/122,680

[22] Filed: Jul. 27, 1998

[51] Int. Cl.[7] ...................... B23P 19/00

[52] U.S. Cl. ...................... 29/798; 29/429; 198/456; 227/100; 227/101

[58] Field of Search ...................... 29/798, 429, 464; 198/456, 418.3, 418.2; 227/6, 40, 44, 45, 48, 50, 99, 100, 101

[56] References Cited

U.S. PATENT DOCUMENTS

| | | | |
|---|---|---|---|
| 3,763,547 | 10/1973 | Blakeslee | 29/430 |
| 3,850,289 | 11/1974 | Behr et al. | 198/456 |
| 3,876,128 | 4/1975 | Feren | 227/44 |
| 4,403,388 | 9/1983 | Belcher | 29/432 |
| 4,427,330 | 1/1984 | Carter | 414/113 |
| 4,467,951 | 8/1984 | Pagano | 227/45 |
| 4,489,874 | 12/1984 | Worst et al. | 29/798 |
| 4,949,892 | 8/1990 | Neely et al. | 227/44 |

*Primary Examiner*—David P. Bryant
*Assistant Examiner*—Jermie E. Cozart
*Attorney, Agent, or Firm*—Adrian D. Battison; Murray E. Thrift

[57] ABSTRACT

An apparatus for assembly of fence panels from a plurality of longitudinal backing rails and a plurality of transverse pickets includes a conveyor for supporting and moving the rails in a direction along their length with the rails at spaced transversely positions across the conveyor and a plurality of rail dispensing hoppers, each for receiving a stack of the backing rails and arranged to dispense the rails one at a time onto the conveyor in parallel spaced relation along the conveyor. A picket dispensing hopper dispenses pickets one at a time onto the aligned rails so that the pickets are positioned at right angles to the rails and side by side. Ends of the pickets are aligned on the rails. The pickets are compressed in a direction at right angles to the rails onto the rails and parallel to the rails and at right angles to the pickets so as to squeeze the pickets edge to edge. A nailing assembly applies nails to connect the pickets to the rails.

14 Claims, 9 Drawing Sheets

APPARATUS FOR AUTOMATIC FENCE PANEL ASSEMBLY

BACKGROUND OF THE INVENTION

The present invention relates to an automatic fence panel assembly apparatus. The present invention uses a continuous motion to build a fence panel using at least one back board in which pickets are vertically mounted, the assembly aligns the panel, compresses the panel against the back boards and compresses the pickets edge to edge, nails and stacks the panel automatically on a conveyor. Previous attempts to automate a fence panel assembly have been unsuccessful.

SUMMARY OF THE INVENTION

According to one aspect of the invention there is provided an apparatus for assembly of fence panels from a plurality of longitudinal backing rails and a plurality of transverse pickets, the apparatus comprising:

- a conveyor for supporting and moving the rails in a direction along their length with the rails at spaced transversely positions across the conveyor;
- a plurality of rail dispensing hoppers, each for receiving a stack of the backing rails and arranged to dispense the rails one at a time onto the conveyor;
- the dispensing hoppers being arranged in parallel, transversely spaced relation so that each dispenses a respective one of the rails onto the conveyor at the respective position so that the rails are aligned across the conveyor;
- at least one picket dispensing hopper arranged transversely across the conveyor for dispensing the pickets one at a time onto the aligned rails so that the pickets are positioned at right angles to the rails and side by side;
- a picket alignment assembly arranged to engage and align ends of the pickets on the rails;
- a first picket compression assembly arranged to compress the pickets in a direction at right angles to the rails onto the rails;
- a second picket compression assembly arranged to compress the pickets parallel to the rails and at right angles to the pickets so as to squeeze the pickets edge to edge;
- and a nailing assembly for applying nails to connect the pickets to the rails.

Preferably the conveyor runs at a constant pace and consists of a plurality of parallel running chains in which a respective rail is placed, the conveyor has a plurality of sections for receiving the rails each section being spaced from the next to leave an open area therebetween.

Preferably the rail dispensing hoppers are arranged at a forwardly and downwardly incline.

Preferably a rail engaging means at the back end of the rail dispensing hopper is arranged to urge the rails forwards onto the conveyor.

Preferably a roller at the front end of the rail dispensing hopper is arranged to guide the rail onto the conveyor when urged by the rail engaging means.

Preferably the rail dispensing hopper has an open end through which the rails are urged.

Preferably the picket dispensing hopper has a picket urging member arranged to horizontally slide the pickets onto the conveyor.

Preferably a picket chain is arranged to receive the pickets for loading onto the conveyor, wherein the picket chain runs parallel with the conveyor, wherein the picket chain runs at a higher speed than the conveyor so that the pickets are loaded appropriately and wherein the picket chain has an inclined front portion to load the pickets onto the rails on the conveyor.

Preferably the picket alignment assembly runs at the same speed as the conveyor and has a first alignment member and a second alignment member on respective sides of the conveyor, the first alignment member is positioned at a right angle to the pickets so as to direct the pickets in a straight manner, the second alignment member is positioned at an inward incline to push a respective end of the pickets against the first alignment member.

Preferably the first alignment member and the second alignment member each have a alignment chain arranged to engage the outermost ends of the pickets, and wherein the alignment chains are mounted on a pair of alignment wheels.

Preferably the first picket compression assembly comprises a plurality of compression chains parallel to the conveyor and positioned off set to the conveyor chains, and run at the same speed.

Preferably the second picket compression assembly is mounted on the conveyor and a picket engage means on respective sides of the pickets for engaging the pickets and is movable relative to the conveyor.

Preferably the second picket compression assembly has a first cam activated lever arranged to engage the pickets when activated, a second cam activated lever arranged to release the pickets when activated.

Preferably the nailing assembly comprises a plurality of nail guns which are positioned in two parallel rows wherein the nail guns apply a nail to the pickets so that the nails are in a staggered manner when completed, wherein the two rows of nail guns are arranged so that one is in front of the other, and wherein the fence panels are nailed when in the first and second compression assembly.

Preferably a stacking assembly on the conveyor is arranged to organise the fence panels for packing.

One embodiment of the invention will now be described in conjunction with the accompanying drawings in which:

BRIEF DESCRIPTION OF THE DRAWINGS

In the drawings the same characters of reference indicate corresponding parts in the different figures.

DETAILED DESCRIPTION

Figure 1:
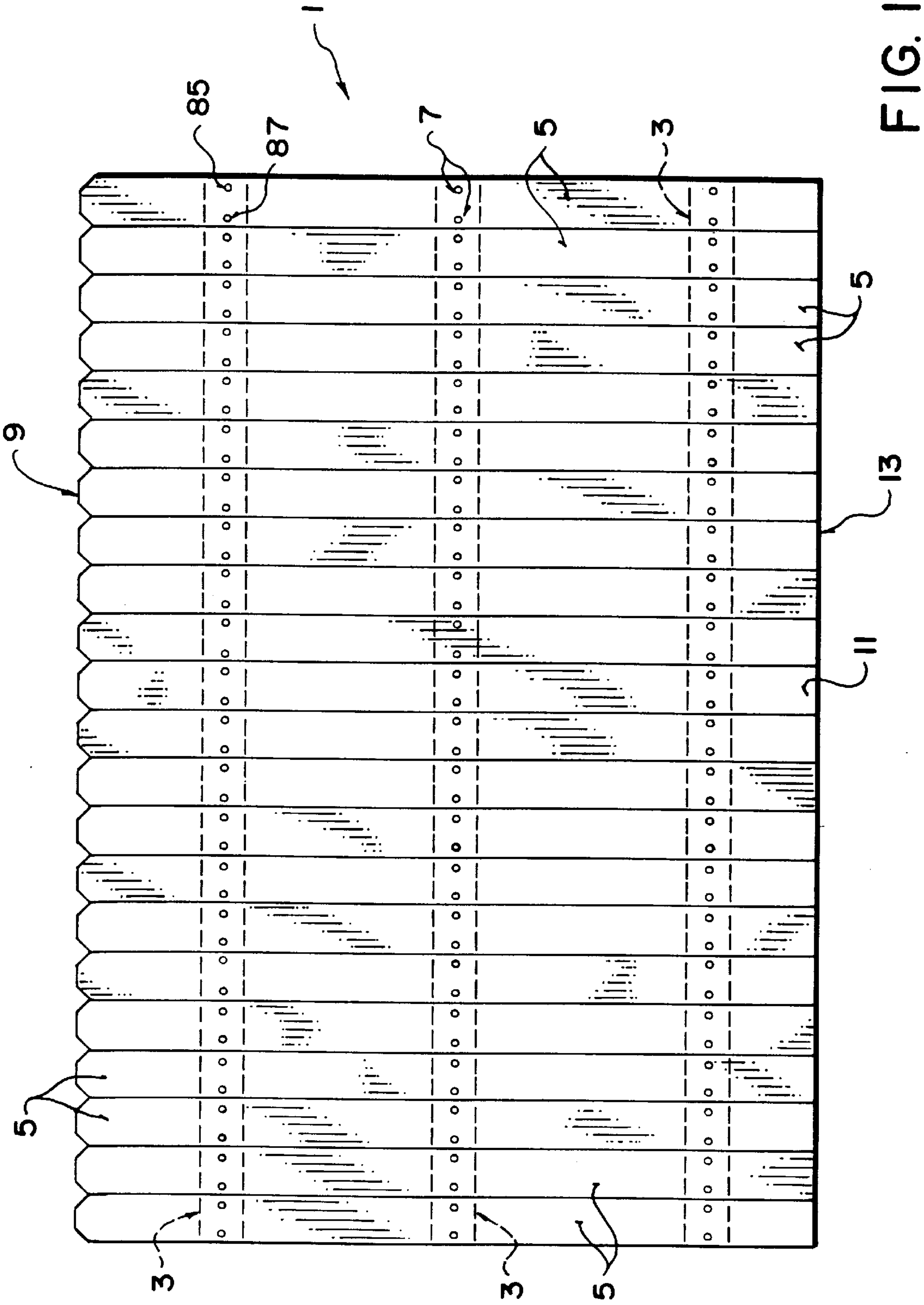
FIG. 1 is a front view of a fence panel.

A fence panel 1, as shown in FIG. 1, has a plurality of longitudinal backing rails 3 and a plurality of transverse pickets 5. The fence panel 1 can be designed wherein the panel has a pair of backing rails and can be designed wherein the panel has three backing rails. An assortment of pickets can be utilised to create a desired style. The fence panel 1 has a plurality of nails 7 grouped in pairs which are arranged at each intersection for connecting the pickets 5 and the rails 3 for supporting the fence panel. The fence panel has a top end 9 and a bottom end 11, the top end 9 has a desired shape for appearance and the bottom end 11 has a flat edge 13 parallel with the rails 3 for engaging the ground. A plurality of fence panels are aligned vertically along the ground for building a fence.

Figure 2:
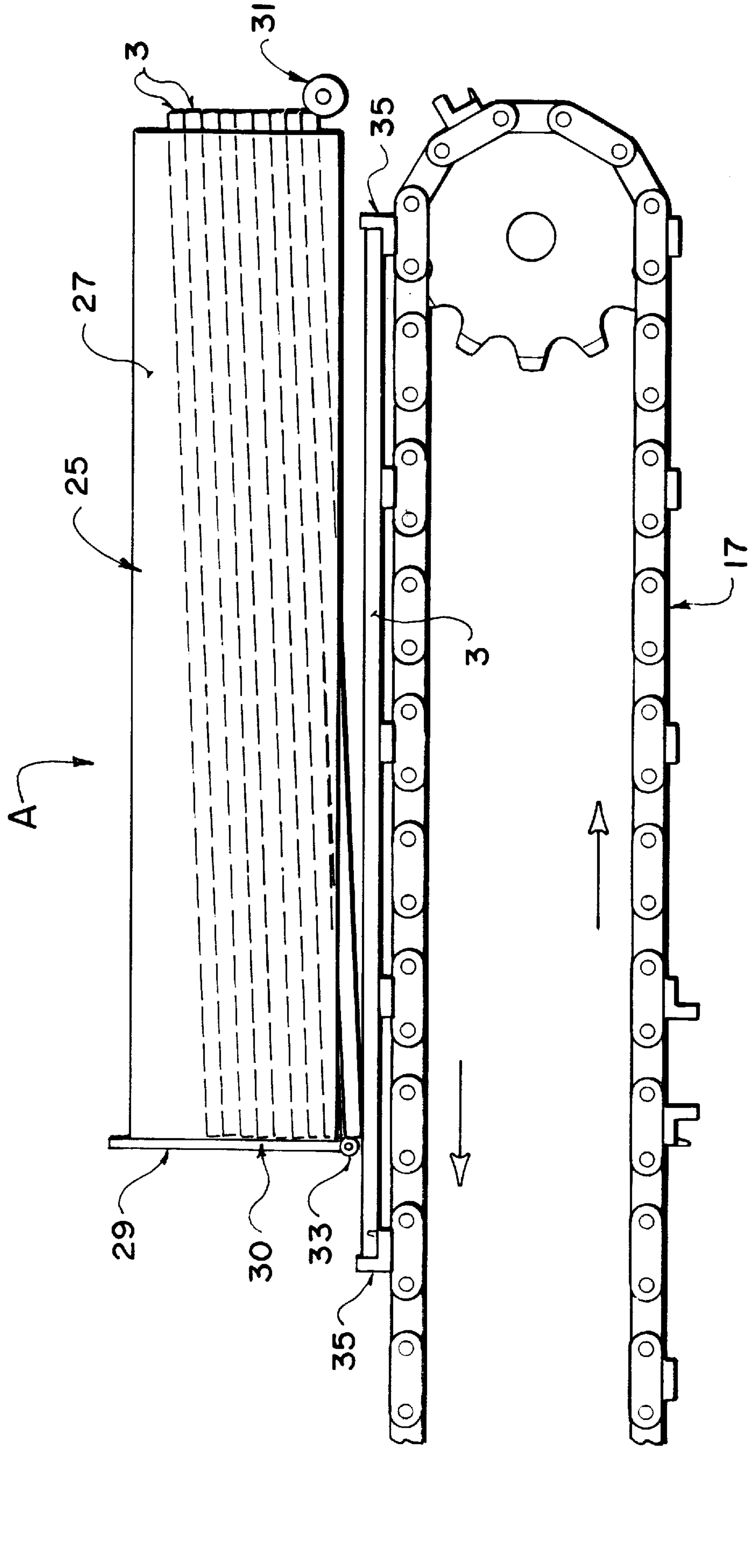
FIG. 2 is a side view of the rail hopper of the apparatus of FIG. 10.
Figure 3:
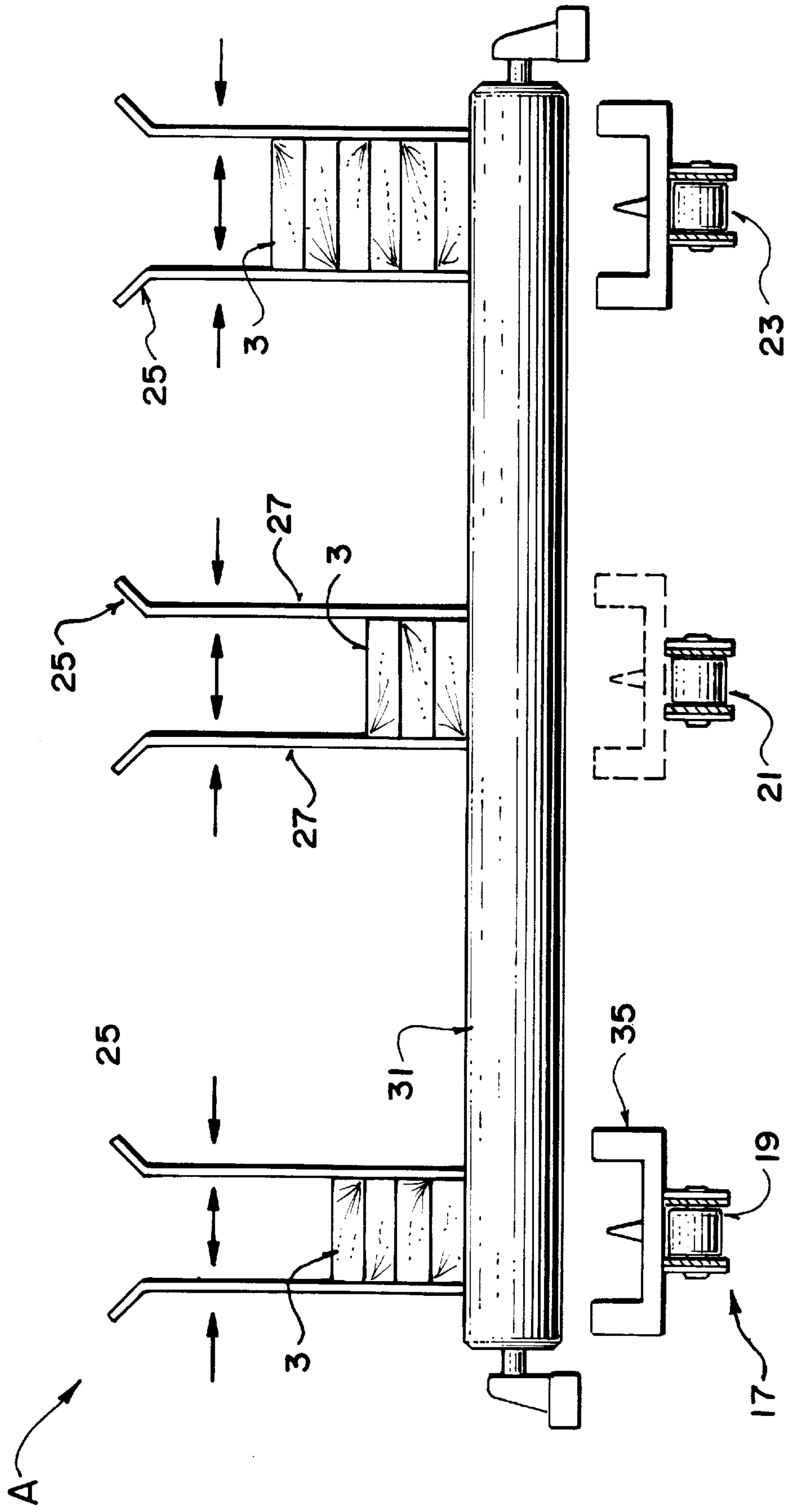
FIG. 3 is a rear view of the rail hopper of FIG. 2.
Figure 10:
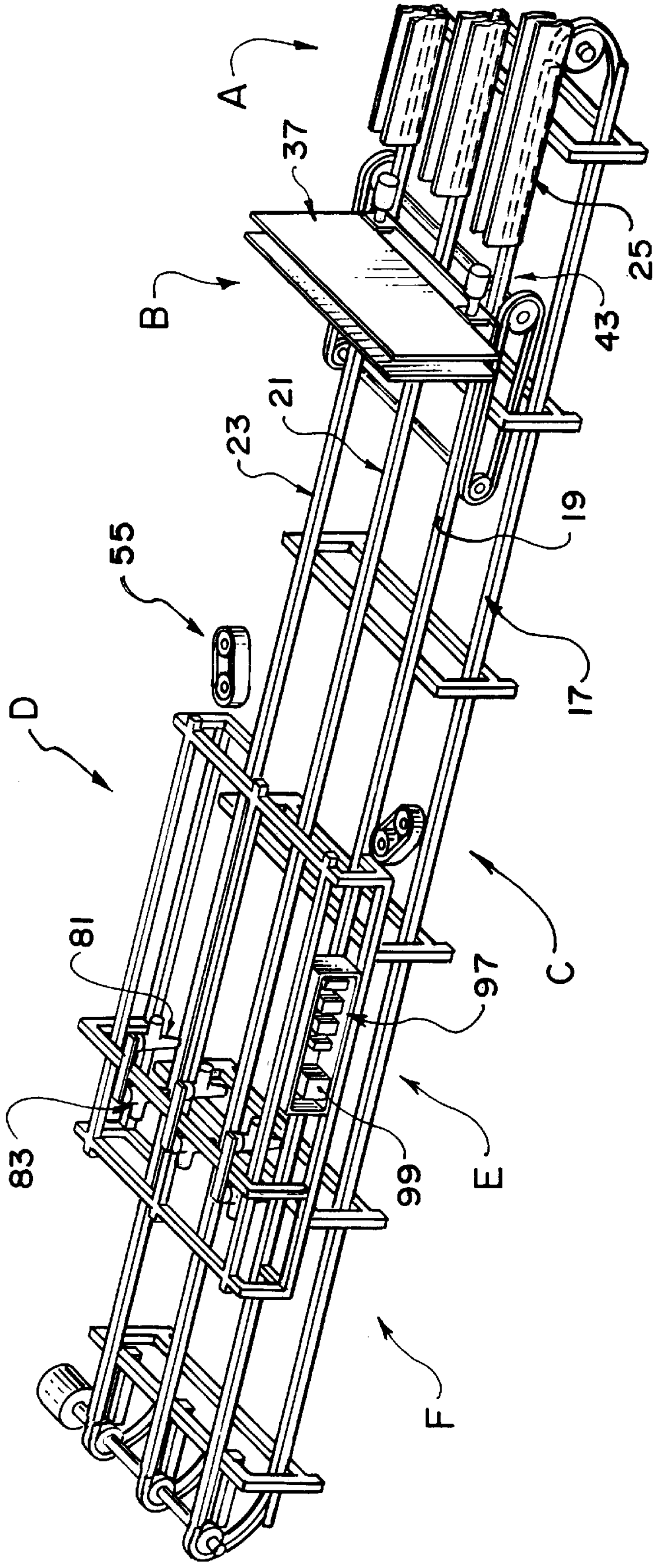
FIG. 10 is an isometric view of the apparatus of the present invention.

A fence panel assembly 15 as shown in FIG. 10, having a plurality of stages, is designed for producing the fence panels 1. The assembly 15 has a first stage, generally indicated at A and best shown in FIGS. 2 and 3, in which the rails 3 are laid out on a conveyor 17, the conveyor defining a first chain 19, a second chain 21 and a third chain 23 which are driven at the same constant rate. Three rail hoppers 25 each for receiving a stack of the rails and arranged to dispense the rails one at a time onto each of the chains on the conveyor.

The rail hoppers 25 arranged in parallel, transversely spaced relation so that each dispenses a respective one of the rails onto the conveyor at the respective position so that the rails are aligned across the conveyor having side walls 27 being slightly shorter in length than the rails, a gate 29 at the front and an open bottom end 30 in which the rails are loaded into. A rail alignment member is arranged to guide the rails onto the conveyor. The rails alignment member extends across the width of the conveyor and has a plurality of slots with inwardly inclined edges to guide the rails so that sides are facing the appropriate direction. The side walls 27 are adjustable inward and outward so that different sized rails can be used. A rail engaging means 31 is arranged to support the back end of the rail so that the front end is lower and is arranged to urge the rails forwardly onto the conveyor. A roller 33 at the front is arranged to guide the rails onto the conveyor 17.

As the conveyor 17 drives past the hopper 25 the front of the rail is engaged and the rail engaging means 31 is actuated so that the rail is dropped through the bottom end 30 and is grabbed by the rail holding means 35 on the conveyor being spaced at an equal length to the rails.

Figure 4:
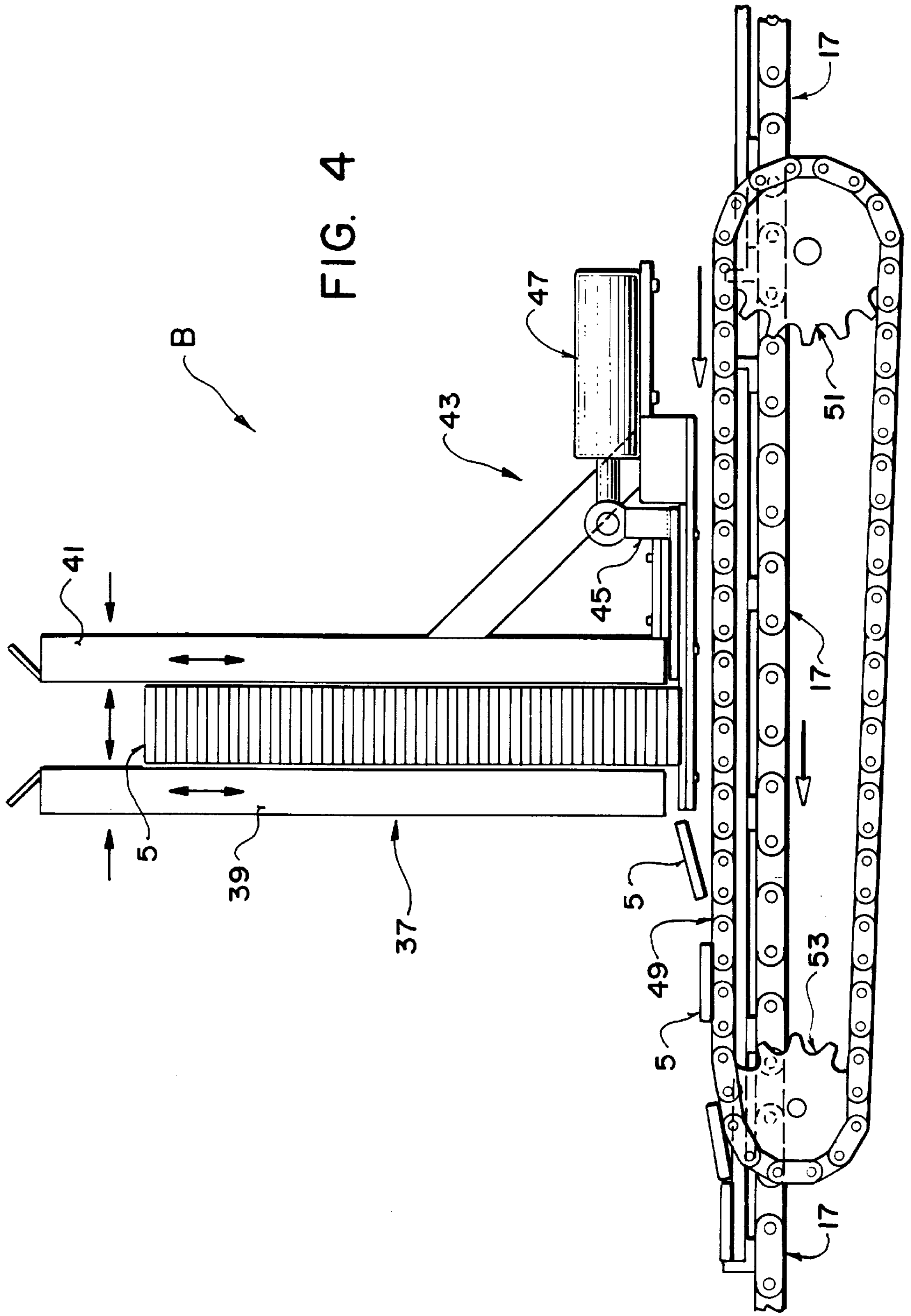
FIG. 4 is a side view of the pivotal hopper of FIG. 2.

A second stage, generally indicated at B and best shown in FIG. 4, has a picket dispensing hopper 37 arranged transversely across the conveyor for dispensing pickets one at a time onto the aligned rails so that the pickets are positioned at right angles to the rails and side by side.

The picket hopper 37 having a front wall 39 and a parallel back wall 41 arranged to guide the pickets onto the conveyor, is arranged to hold a stack of pickets 65 at right angle to the conveyor and is adjustable to hold different arrangements of pickets. A picket dispense assembly 43 has a dispensing arm 45 connected to a cylinder 47 arranged to engage the picket pushing it onto a picket chain 49 as it is released by the picket hopper. The picket chain is located beneath the picket hopper, being driven by a picket drive wheel 51 and extends forwardly to a picket wheel 53 being angled downwardly to be level at the picket wheel with the conveyor. The picket chain is arranged to drive at a speed faster than the conveyor so that pickets drop onto the rails side by side.

Figure 5:
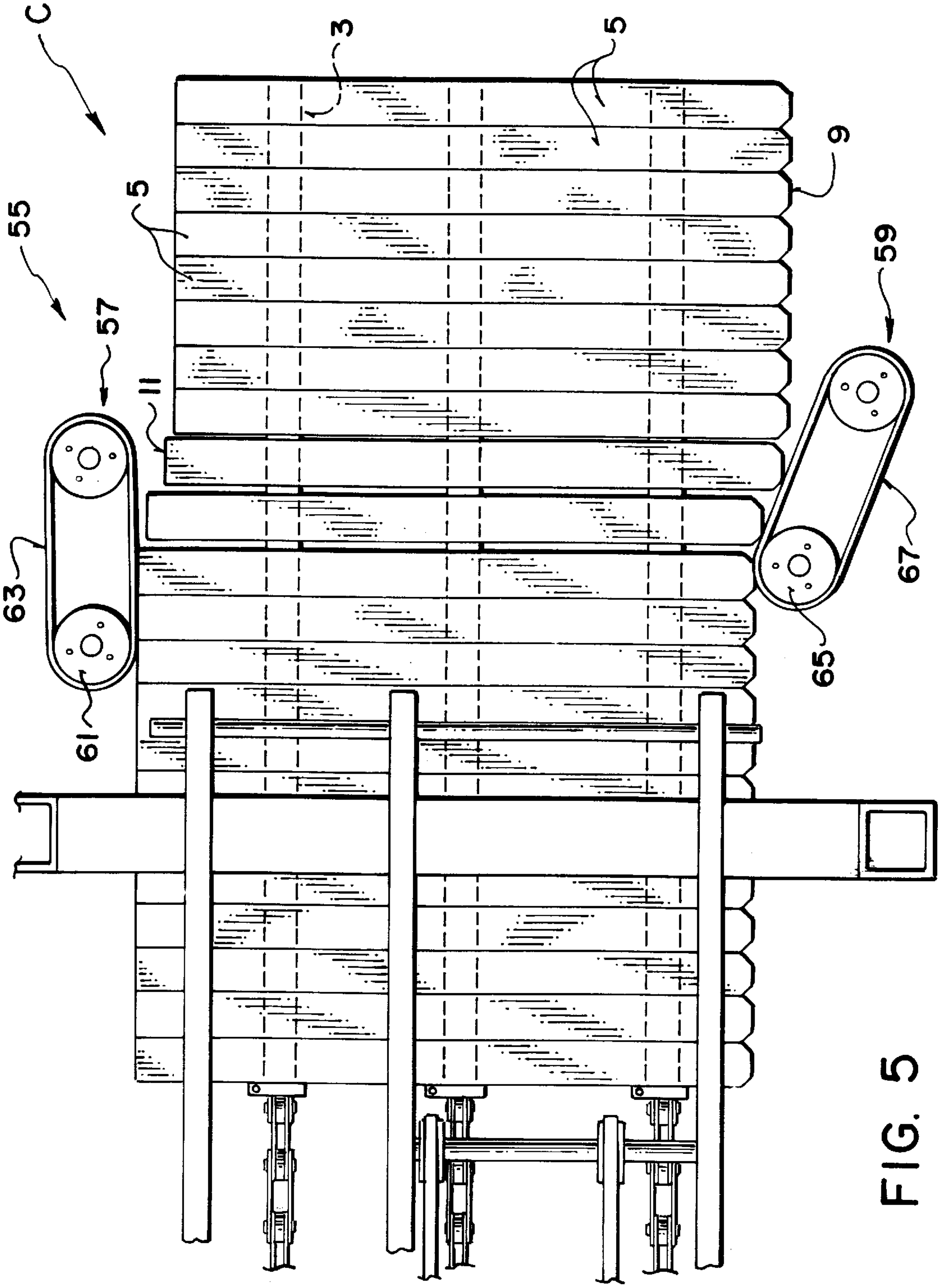
FIG. 5 is a top plan view of the pivotal alignment assembly of the apparatus of FIG. 10.

A third stage, generally indicated at C and best shown in FIG. 5, has a picket alignment assembly 55 arranged to engage and align ends of the pickets on the rails. The assembly 55 comprises a first alignment portion 57 is arranged to engage the bottom end 11 of the pickets. As second alignment portion 59 is arranged to engage the top end 9 of the pickets. The first alignment portion 57 has a first pair of drive wheels 61 which drive a first alignment chain 63 parallel to the rails at a speed equal to that of the conveyor. The second alignment portion 59 has a second pair of drive wheels 65 which drive a second alignment chain 67 at an inward angle arranged so that the chain pushes the pickets towards the first chain 63 when passes on the conveyor. The alignment portions are spaced appropriately equal to the length of the pickets.

Figure 6:
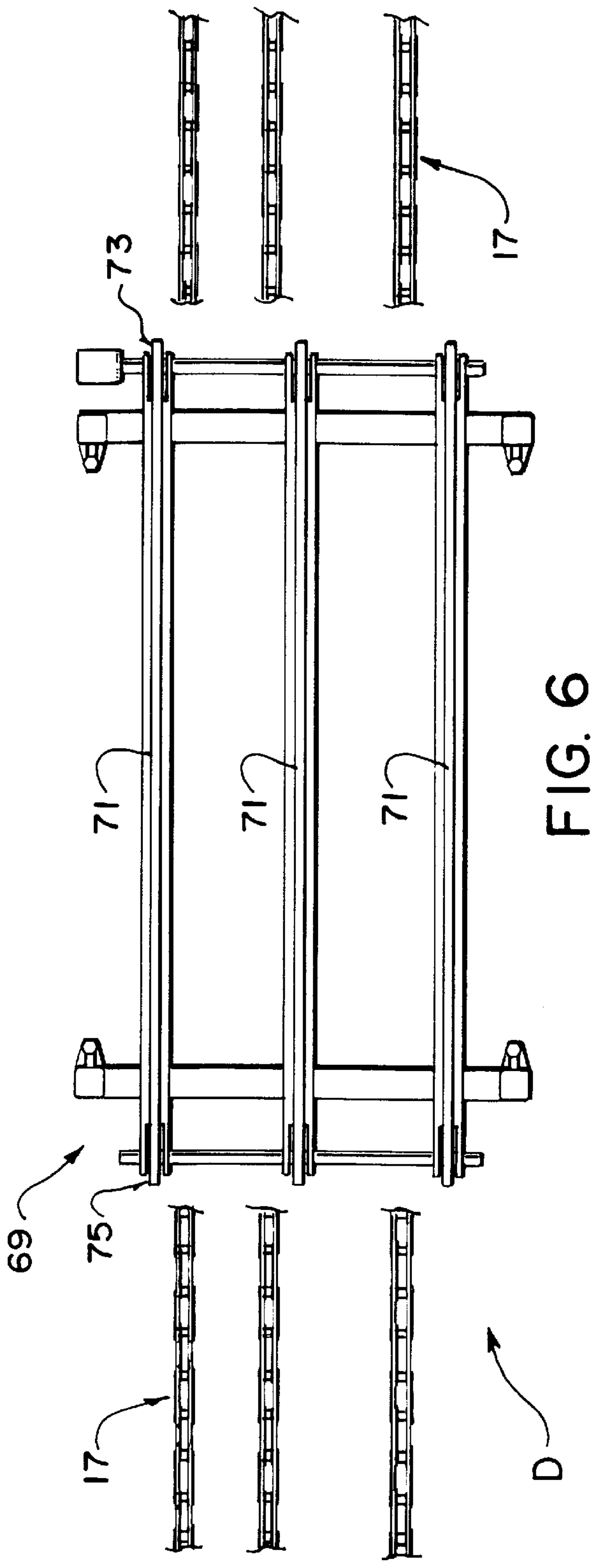
FIG. 6 is a top plan view of the first pivotal compression assembly of the apparatus FIG. 10.
Figure 7:
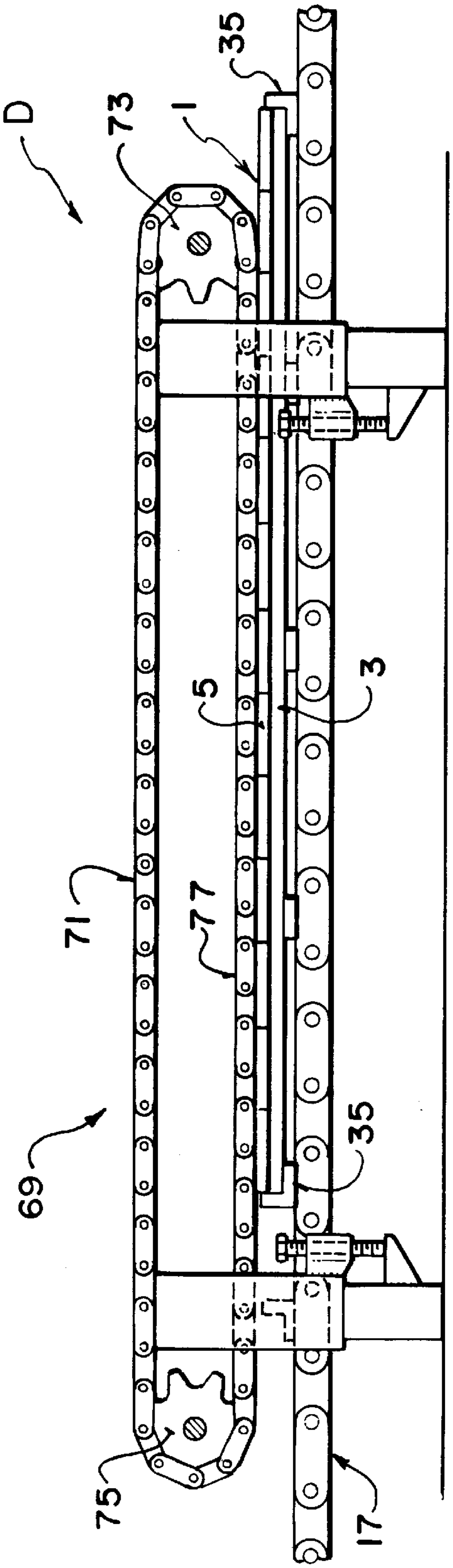
FIG. 7 is a side view of the first pivotal compression assembly of FIG. 6.

A fourth stage, generally indicated at D and best shown in FIGS. 6 and 7, has a first picket compression assembly 69 arranged to compress the pickets in a direction at right angles to the rails onto the rails after the pickets have been aligned. Three compression chains 71 are driven by compression drive wheels 73 and guided by compression wheels 75 at the same speed as the conveyor at respective ends. The compression chain 71 has a outer edge portion 77 arranged to engage the pickets and push downward compressing the pickets on the rails. The compression chains are parallel to the chains 19, 21 and 23 on the conveyor and are placed appropriately so that the compression chains are spaced inward such that the compression chains and the chains run on different lines.

Figure 8:
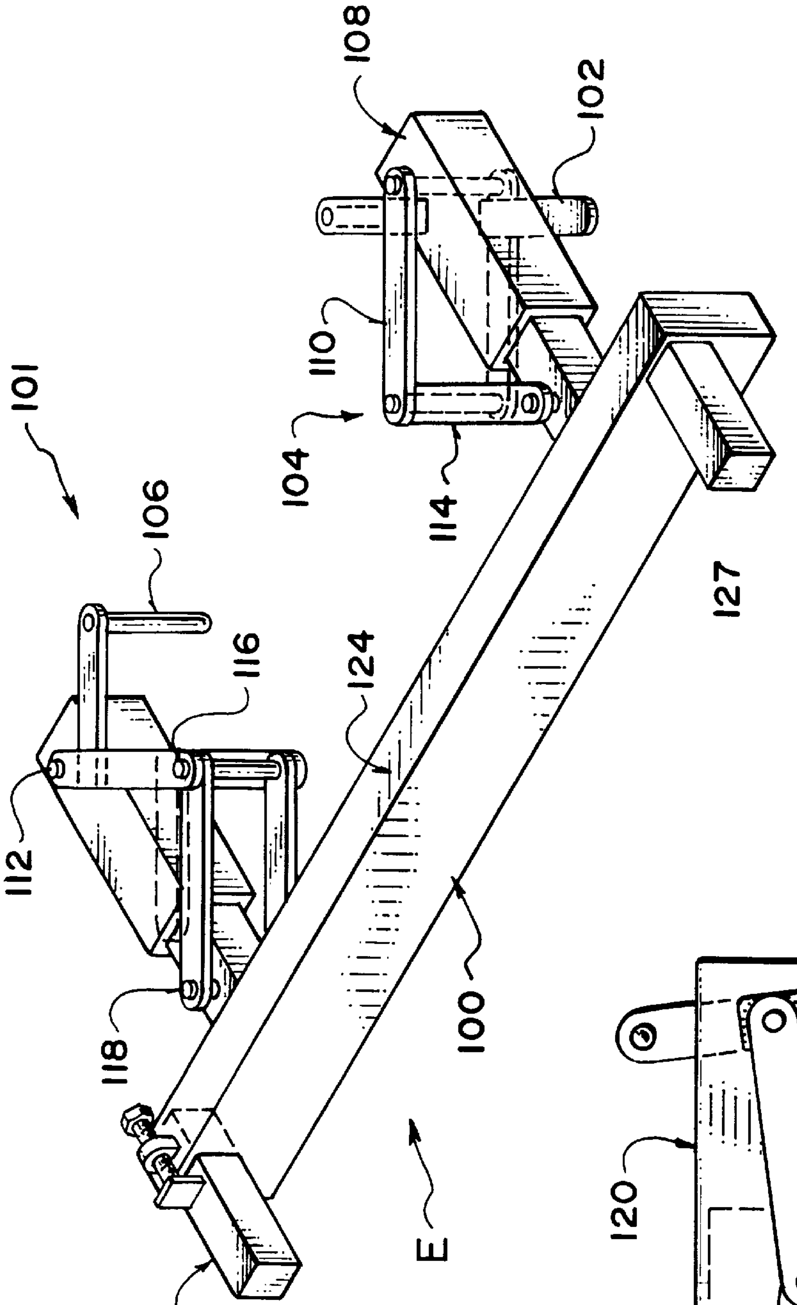
FIG. 8 is an isometric view of the second pivotal compression assembly of the apparatus of FIG. 10.
Figure 8A:
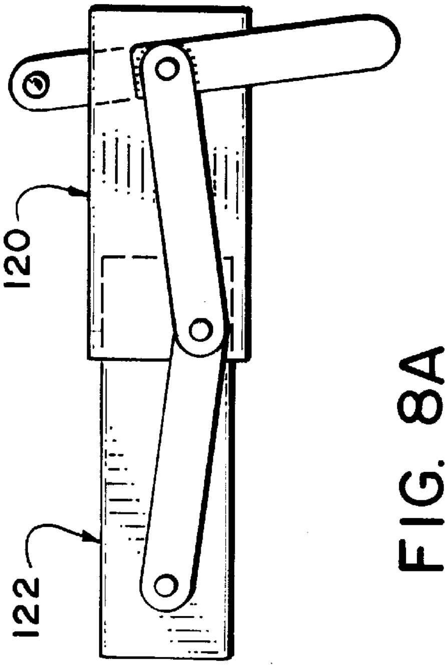
FIG. 8A is a side view of the second pivotal compression of FIG. 8.

A fifth stage, generally indicated at E and best shown in FIGS. 8 and 8A, has a second picket compression assembly 100 arranged to compress the pickets 5 parallel to the rails 3 and at right angles to the pickets 5 so as to squeeze the pickets 5 edge to edge. The second picket compression assembly 100 is mounted on the conveyor 17, is moveable in a direction to the conveyor 17 and comprises a pair of lever arrangements 101. Each lever arrangement having a first can actuated lever 102 which extends outwardly forward, an arm assembly 104 in which the first lever is attached, a second cam actuated lever 106 which extends outwardly downward and rearward from the arm assembly 104 and a sleeve arrangement 108. The arm arrangement 104 has a first arm 110 which is attached to the levers 102 and 106 and is mounted on the sleeve arrangement 108 by a hinge 112. The first arm 110 extends forwardly to a second arm 114 whereat a second hinge 116 connects the two arms 110 and 114. The second arm 114 is mounted on the sleeve arrangement 108 by a third hinge 118.

The sleeve arrangement 108 has an outer portion 120 and inner portion 122. The inner portion 122 is mounted on respective ends of a horizontal beam 124 in which the inner portion 122 extends rearwardly therefrom. The inner portion 122 is inserted into the outer portion 20 and is held by an internal spring, not shown, connected at respective ends by the first hinge 112 and the third hinge 118.

The first lever is arranged to pull the second hinge on the arms inward past center extending the inner portion outward in a forward direction forcing the horizontal beam 124 forward such that the engage bars 126 and 127 on respective ends engage the pickets.

The second lever is arranged to pull the second hinge on the arms outward retracting the inner portion inward in a rearward direction forcing the horizontal beams 124 rearward such that the pickets are disengaged.

The first lever is actuated by a engaging means when passing on the conveyor. The second lever is actuated by a second engaging means when passing on the conveyor.

Figure 9:
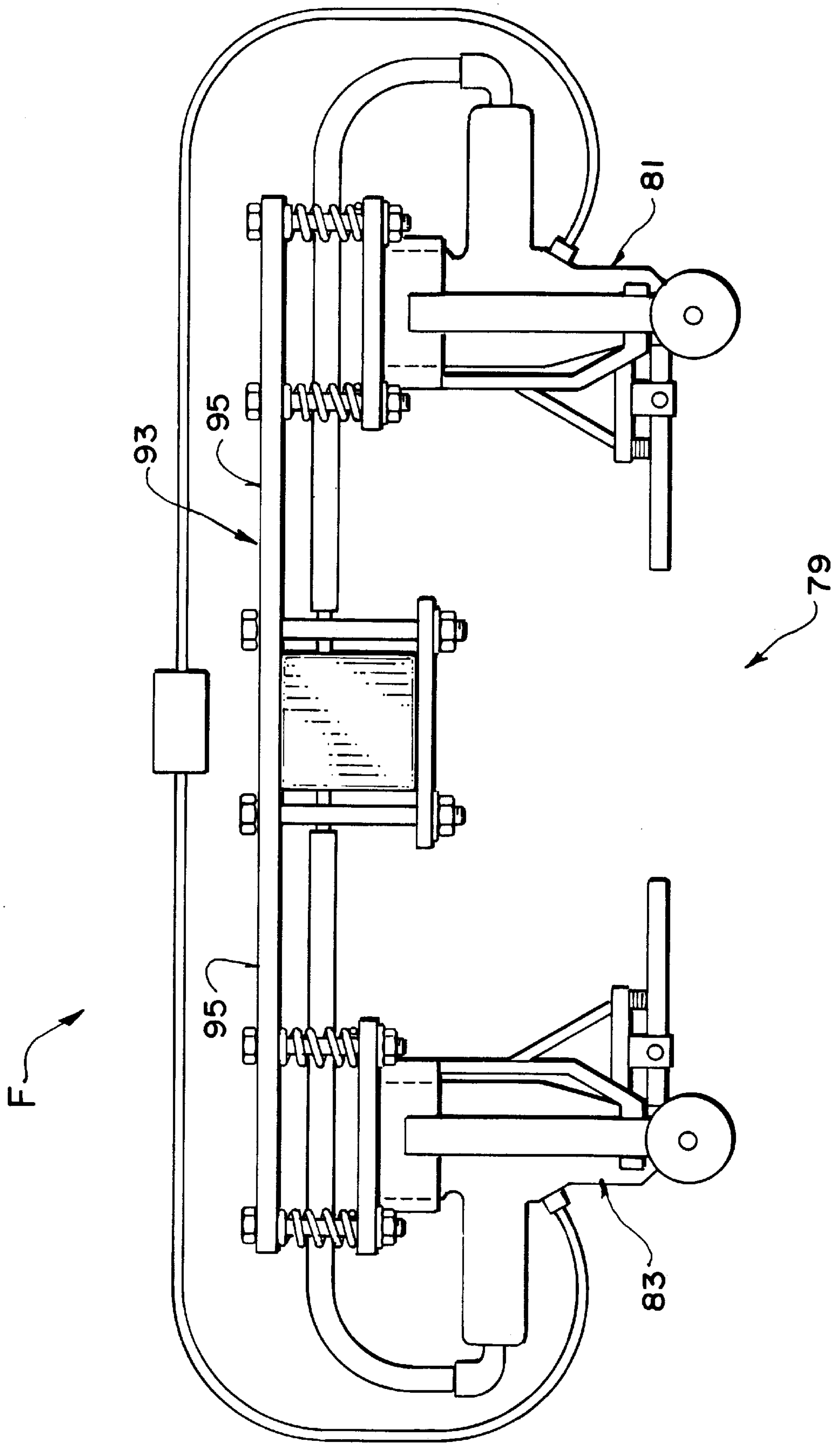
FIG. 9 is a side view of the rail assembly of the apparatus of FIG. 10.

A sixth stage, generally indicated at F and best shown in FIG. 9, has a nail assembly 79 arranged for applying nails to connect the pickets 5 to the rails 3. The nail assembly 79 has a first set of nail guns 81 and a second set of nail guns 83. The first set 81 is positioned to apply a first row of nails 85 and the second set 83 is positioned to apply a second row of nails 87 in a staggered manner on each picket, as best shown in FIG. 1. Two individual nail guns are positioned parallel to engage a respective rail defining the first set 81. Two individual second nail guns are positioned parallel to engage a respective rail defining the second set 83. The nail assembly 79 is located at stage D wherein the fence panel is compressed so that the nails connect the picket to the rail when compressed. The nail assembly is adjustable so that different sized panels can be nailed.

The nail assembly is mounted on a cross bar 93 which extends horizontally and is parallel with the rails. An adjustable arm 95 extends outwardly at right angle from cross bar 93 for supporting the nail guns 81 and 83.

As shown in FIG. 10, the stages 1 through 6 are arranged so that the panel runs constantly into each stage on the conveyor 17, which extends along the length of the assembly. A stacking assembly, not shown, takes the completed fence panel from after nailing and positions the panel appropriately for stacking so that the panels can be shipped and the stacking assembly allows the assembly to run continuously.

A control panel 97 is arranged to control the actions of the stages so that the fence is built in a continuous assembly. A timing means 99 on the control panel 97 activates the stages to operate at a particular time.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

I claim:

1. Apparatus for assembly of fence panels from a plurality of longitudinal backing rails and a plurality of transverse pickets, the apparatus comprising:

a conveyor movable continuously through a plurality of sequentially arranged stages;

the conveyor being arranged for supporting and moving the backing rails in a direction along their length with the rails at spaced transversely positions across the conveyor;

a plurality of rail dispensing hoppers arranged at a first stage, each for receiving a stack of the backing rails and arranged to dispense the rails one at a time onto the conveyor;

the dispensing hoppers being arranged in parallel, transversely spaced relation so that each dispenses a respective one of the rails onto the conveyor at the respective position so that the rails are aligned across the conveyor;

at least one picket dispensing hopper at a second stage arranged transversely across the conveyor for dispensing the pickets one at a time onto the aligned rails so that the pickets are positioned at right angles to the rails, the conveyor being arranged such that the pickets are carried on the rails so as to be moved on the conveyor simultaneously with the rails;

a picket alignment assembly at a third stage arranged at a position relative to the conveyor downstream of the second stage to engage and align ends of the pickets while carried on the rails;

a picket compression assembly at a fourth stage arranged to compress the pickets in a direction at right angles to the rails and in a direction onto the rails;

the picket compression assembly being to arranged to effect compression of the pickets onto the rails as the pickets and rails move with the conveyor;

and a nailing assembly for applying nails to connect the pickets to the rails while the pickets are compressed onto the rails.

2. The apparatus according to claim 1 wherein the conveyor includes a drive assembly arranged to drive the conveyor at a constant speed and wherein the conveyor includes a plurality of parallel chains each having a support in which a respective rail is placed.

3. The apparatus according claim 2 wherein each chain of the conveyor has a plurality of supports for receiving the rails each support being spaced from the next to leave an open area therebetween.

4. The apparatus according to claim 1 wherein the rail dispensing hoppers are arranged to be inclined forwardly and downwardly.

5. The apparatus according to claim 1 wherein each rail dispensing hopper includes a rail engaging means at a rear end of the rail dispensing hopper which is arranged to urge the rails forwards onto the conveyor.

6. The apparatus according to claim 5 wherein each rail dispensing hopper includes a roller at a forward and of the rail dispensing hopper which is arranged to guide the rail onto the conveyor when urged by the rail engaging means.

7. The apparatus according to claim 1 wherein the nailing assembly comprises a plurality of nail guns which are positioned in two parallel rows arranged so that one is in front of the other such that the nail guns apply a nail to the pickets so that the nails are in a staggered manner when completed.

8. Apparatus for assembly of fence panels from a plurality of longitudinal backing rails and a plurality of transverse pickets, the apparatus comprising:

a conveyor movable continuously through a plurality of sequentially arranged stages;

the conveyor being arranged for supporting and moving the backing rails in a direction alone their length with the rails at spaced transversely positions across the conveyor;

a plurality of rail dispensing hoppers arranged at a first stage, each for receiving a stack of the backing rails and arranged to dispense the rails one at a time onto the conveyor;

the dispensing hoopers being arranged in parallel, transversely spaced relation so that each dispenses a respective one of the rails onto the conveyor at the respective position so that the rails are aligned across the conveyor;

at least one picket dispensing hopper at a second stage arranged transversely across the conveyor for dispensing the pickets one at a time onto the aligned rails so that the pickets are positioned at right angles to the rails, the conveyor being arranged such that the pickets are carried on the rails so as to be moved on the conveyor simultaneously with the rails;

a picket compression assembly arranged to compress the pickets in a direction at right angles to the rails and in a direction onto the rails;

the picket compression assembly being arranged to effect compression of the pickets onto the rails as the pickets and rails move with the conveyor;

and a nailing assembly for applying nails to connect the pickets to the rails while the pickets are compressed onto the rails;

wherein the picket dispensing hopper includes a picket chain which is arranged to receive the pickets for loading onto the conveyor, wherein the picket chain runs parallel with the conveyor, wherein the picket chain runs at a higher speed than the conveyor so that the pickets are loaded appropriately and wherein the picket chain has a forwardly and downwardly inclined front portion to load the pickets onto the rails on the conveyor.

9. Apparatus for assembly of fence panels from a plurality of longitudinal backing rails and a plurality of transverse pickets, the apparatus comprising:

a conveyor movable continuously through a plurality of seguentially arranged stages;

the conveyor being arranged for supporting and moving the backing rails in a direction along their length with the rails at spaced transversely positions across the conveyor;

a plurality of rail dispensing hoppers arranged at a first stages each for receiving a stack of the backing rails and arranged to dispense the rails one at a time onto the conveyor;

the dispensing hoppers being arranged in parallel, transversely spaced relations so that each dispenses a respective one of the rails onto the conveyor at the repective position so the the rails are aligned across the conveyor;

at least one picket dispensing hopper at a second stage arranged transversely across the conveyor for dispensing the pickets one at a time onto the aligned rails so that the pickets are positioned at right angles to the rails, the conveyor being arranged such that the pickets are carried on the rails so as to be moved on the conveyor simultaneously with the rails;

a picket alignment assembly at a third stage arranged to engage and align ends of the pickets while carried on the rails;

a picket compression assembly at a fourth stage arranged to compress the pickets in a direction at right angles to the rails and in a direction onto the rails;

the picket compression assembly being arranged to effect compression of the pickets onto the rails as the pickets and rails move with the conveyor;

and a nailing assembly for applying nails to connect the pickets to the rails while the pickets are compressed onto the rails;

wherein the picket alignment assembly runs at the same speed as the conveyor and has a first alignment member and a second alignment member on respective sides of the conveyor, the first alignment member is positioned at a right angle to the pickets so as to direct the pickets in a straight manner, the second alignment member is positioned at an inward incline to push a respective end of the pickets against the first alignment member.

10. The apparatus according to claim 9 wherein the first alignment member and the second alignment member each have a alignment chain arranged to engage the outermost ends of the pickets, and wherein each alignment chain is mounted on a respective pair of alignment wheels.

11. Apparatus for assembly of fence panels from a plurality of longitudinal backing rails and a plurality of transverse pickets, the apparatus comprising:

a conveyor movable continuously through a plurality of sequentially arranged stages;

the conveyor being arranged for supporting and moving the backing rails in a direction along their length with the rails at spaced transversely positions across the conveyor;

a plurality of rail dispensing hoppers arranged at a first stage, each for receiving a stack of the backing rails and arranged to dispense the rails one at a time onto the conveyor;

the dispensing hoppers being arranged in parallel, transversely spaced relation so that each dispenses a respective one of the rails onto the conveyor at the respective position so that the rails are aligned across the conveyor;

at least one picket dispensing hopper at a second stage arranged transversely across the conveyor for dispensing the pickets one at a time onto the aligned rails so that the pickets are positioned at right angles to the rails, the conveyor being arranged such that the pickets are carried on the rails so as to be moved on the conveyor simultaneously with the rails;

a picket compression assembly arranged to compress the pickets in a direction at right angles to the rails and in a direction onto the rails;

the picket compression assembly being arranged to effect compression of the pickets onto the rails as the pickets and rails move with the conveyor;

and a nailing assembly for applying nails to connect the pickets to the rails while the pickets are compressed onto the rails;

wherein the picket compression assembly comprises a plurality of compression chains parallel to the conveyor and positioned above the conveyor and run at the same speed as the conveyor.

12. Apparatus for assembly of fence panels from a plurality of longitudinal backing rails and a plurality of transverse pickets, the apparatus comprising:

a conveyor movable continuously through a plurality of sequentially arranged stages;

the conveyor being arranged for supporting and moving the backing rails in a direction alone their length with the rails at spaced transversely positions across the conveyor;

a plurality of rail dispensing hoppers arranged at a first stage, each for receiving a stack of the backing rails and arranged to dispense the rails one at a time onto the conveyor;

the dispensing hoppers being arranged in parallel, transversely spaced relation so that each dispenses a respective one of the rails onto the conveyor at the respective position so that the rails are aligned across the conveyor;

at least one picket dispensing hopper at a second stage arranged transversely across the conveyor for dispensing the pickets one at a time onto the aligned rails so that the pickets are positioned at right angles to the rails, the conveyor being arranged such that the pickets are carried on the rails so as to be moved on the conveyor simultaneously with the rails;

a first picket compression assembly arranged to compress the pickets in a direction at right angles to the rails and in a direction onto the rails;

a second picket compression assembly arranged to compress the pickets parallel to the rails and at right angles to the pickets so as to squeeze the pickets edge to edge;

the first picket compression assembly being arranged to effect compression of the pickets onto the rails as the pickets and rails move with the conveyor;

and a nailing assembly for applying nails to connect the pickets to the rails while the pickets are compressed onto the rails;

wherein the second picket compression assembly is mounted on the conveyor and includes a picket engagement means on respective sides of the pickets for engaging the pickets, the picket engagement means being movable relative to the conveyor to squeeze the pickets edge to edge.

13. The apparatus according to claim 12 wherein the second picket compression assembly has a first cam activated lever arranged to engage the pickets when activated and a second cam activated lever arranged to release the pickets when activated.

14. Apparatus for assembly of fence panels from a plurality of longitudinal backing rails and a plurality of transverse pickets, the apparatus comprising:

a conveyor movable continuously through a plurality of sequentially arranged stages;

the conveyor being arranged for supporting and moving the backing rails in a direction along their length with the rails at spaced transversely positions across the conveyor;

a plurality of rail dispensing hoppers arranged at a first stage, each for receiving a stack of the backing rails and arranged to dispense the rails one at a time onto the conveyor;

the dispensing hoppers being arranged in parallel, transversely spaced relation so that each dispenses a respective one of the rails onto the conveyor at the respective position so that the rails are aligned across the conveyor;

at least one picket dispensing hopper at a second stage arranged transversely across the conveyor for dispensing the pickets one at a time onto the aligned rails so that the pickets are positioned at right angles to the rails, the conveyor being arranged such that the pickets are carried on the rails so as to be moved on the conveyor simultaneously with the rails;

a picket compression assembly arranged to compress the pickets in a direction at right angles to the rails and in a direction onto the rails;

the picket compression assembly being arranged to effect compression of the pickets onto the rails as the pickets and rails move with the conveyor;

and a nailing assembly for applying nails to connect the pickets to the rails while the pickets are compressed onto the rails;

wherein there is provided a stacking assembly on the conveyor which is arranged to organize the fence panels for packing.

* * * * *